US012770158B2

(12) United States Patent
Nunally

(10) Patent No.: US 12,770,158 B2
(45) Date of Patent: Oct. 20, 2026

(54) DATA BRIDGE BETWEEN ANONYMOUS BROWSERS AND INTERACTIVE DEVICES

(71) Applicant: Datum Point Labs Inc., Jackson, WY (US)

(72) Inventor: Patrick Nunally, San Diego, CA (US)

( * ) Notice: Subject to any disclaimer, the term of this patent is extended or adjusted under 35 U.S.C. 154(b) by 0 days.

(21) Appl. No.: 18/945,344

(22) Filed: Nov. 12, 2024

(65) Prior Publication Data

US 2025/0156886 A1 May 15, 2025

Related U.S. Application Data

(60) Provisional application No. 63/598,468, filed on Nov. 13, 2023.

(51) Int. Cl.
*G06Q 30/0201* (2023.01)
*G06Q 30/0601* (2023.01)

(52) U.S. Cl.
CPC ..... *G06Q 30/0201* (2013.01); *G06Q 30/0643* (2013.01)

(58) Field of Classification Search
None
See application file for complete search history.

(56) References Cited

U.S. PATENT DOCUMENTS 10,832,062 B1 * 11/2020 Evans .................. G05D 1/0246
2012/0278176 A1 * 11/2012 Naor .................. G06Q 30/0207 705/14.66
2014/0074550 A1 * 3/2014 Chourey ................ G06Q 30/02 705/7.29
2014/0363059 A1 * 12/2014 Hurewitz ............. G06Q 30/015 382/118
2015/0350435 A1 * 12/2015 Connolly ........... G06Q 30/0201 379/265.03

FOREIGN PATENT DOCUMENTS

CA 3052661 A1 * 2/2020 ......... G06Q 30/0633

OTHER PUBLICATIONS

Binns, Reuben. "Tracking on the Web, Mobile and the Internet of Things." Foundations and Trends® in Web Science 8, No. 1-2 (2022): 1-113. (Year: 2022).*

* cited by examiner

*Primary Examiner* — Mehmet Yesildag
*Assistant Examiner* — Michael Borowski
(74) *Attorney, Agent, or Firm* — The Rapacke Law Group, P.A.

(57) ABSTRACT

Embodiments described herein provide systems and methods for correlating anonymous user data with in-person user sensor data. In some embodiments, a user interacts with a web interface which collects sensor data (e.g., video and audio) and stores that sensor data with other customer information (e.g., browsing history). The collected data is sent to a local interaction device which collects its own sensor data, which is compared to the data in the packets to correlate the in-person user with the online user, and continue the customer experience.

14 Claims, 5 Drawing Sheets

DATA BRIDGE BETWEEN ANONYMOUS BROWSERS AND INTERACTIVE DEVICES

TECHNICAL FIELD

The embodiments relate generally to systems and methods for anonymous browsers.

BACKGROUND

Recognizing and correlating individuals who visit a company's website, enter their physical store, and/or make purchases is crucial for businesses aiming to enhance customer experience and tailor their marketing strategies effectively. In the online realm, tracking website visitors allows companies to gather valuable data on user behavior, preferences, and demographics. This data can be leveraged to create personalized online experiences, targeted advertising, and recommendations, ultimately fostering customer engagement and loyalty. Understanding the online customer journey enables companies to optimize their website design, content, and functionality to better meet the needs and expectations of their audience.

Similarly, acknowledging individuals who physically visit a company's store is important for providing an integrated and seamless customer experience across different channels. By implementing technologies like in-store tracking or loyalty programs, businesses can bridge the gap between the online and offline worlds. Recognizing customers when they enter a physical store allows companies to offer personalized assistance, promotions, or rewards based on their past interactions and preferences. This not only enhances customer satisfaction but also encourages repeat visits and builds a stronger brand-consumer relationship.

Currently there are no effective ways to correlate and provide attribution to anonymous individuals who have browsed a website with a subset of those individuals who visit the store. In short, if a user does not establish an account as an outcome of their web visit it is difficult to know which individuals who visit a store on-site to make purchases can be attributed to the earlier browser engagement. Connecting online and in person sales processes as part of a single sales process has been difficult as users often explore products, colors, options, etc. which becomes the motivation for a subsequent visit to one or more physical sites. While companies identify the most successful marketing channels, campaigns, or touchpoints as those that lead to conversions, those conversions often require interactions beyond those supported by ecommerce. Currently the transition from online to in-person sale largely results in a restart of the sales process as the local vendor is unaware of the customer's prior customer journey, requirements, and overt interests.

Additionally, customers of on-line experience or physical activities represent an opportunity to cross sell between vendors. Currently cross selling opportunities in there environments are limited to browser only interactions technologies such as Cookie syncing (sometimes called cookie matching) which is a process used to synchronize user data across different sales networks. However, Cookie syncing is generally insufficient because of both increasing rejection of cookies as well as the inability to connect online activity of anonymous users to physical sales interactions. Therefore, there is a need for systems and methods for continuity of service between anonymous on-line browser interactions and on-site interactions.

DETAILED DESCRIPTION

Figure 1:
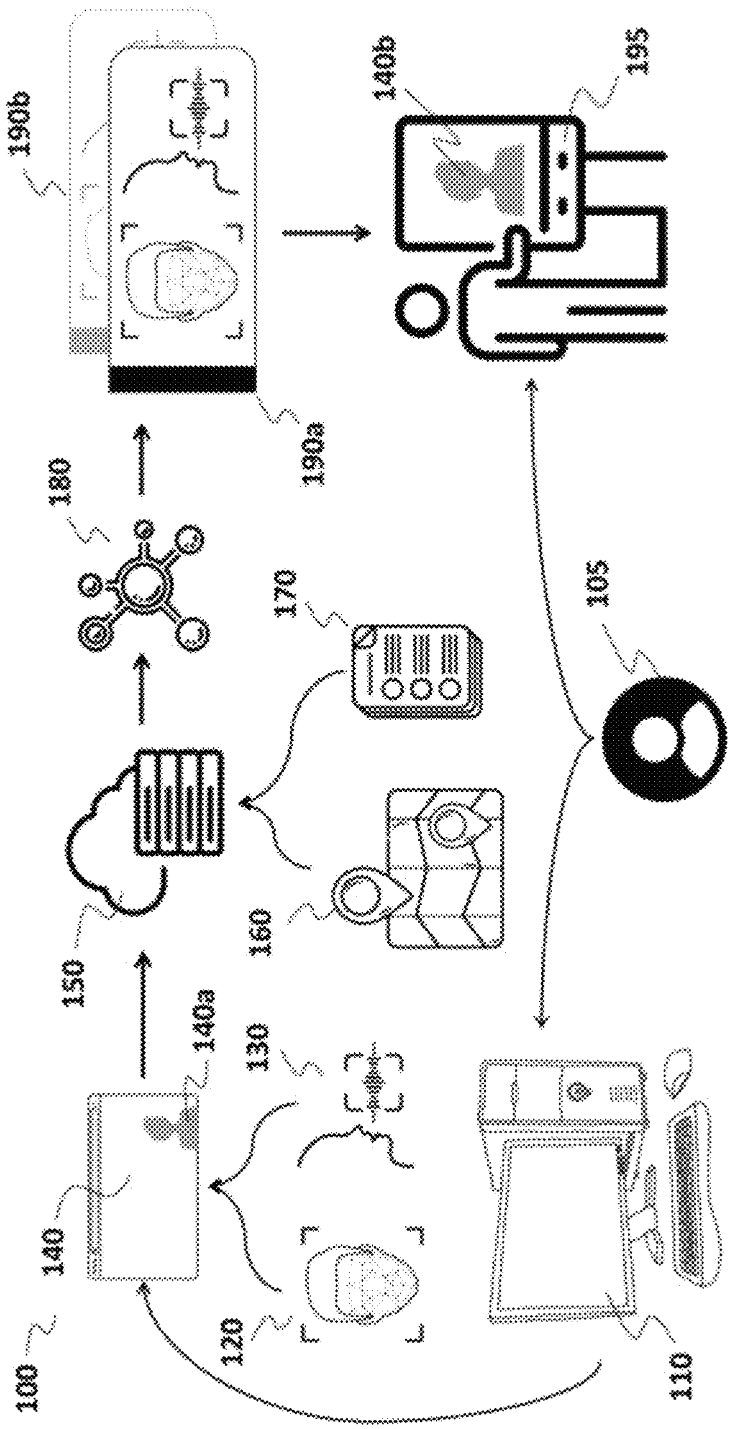
FIG. 1 illustrates an exemplary system for continuity of service, according to some embodiments.

Recognizing and correlating individuals who visit a company's website, enter their physical store, and/or make purchases is crucial for businesses aiming to enhance customer experience and tailor their marketing strategies effectively. In the online realm, tracking website visitors allows companies to gather valuable data on user behavior, preferences, and demographics. This data can be leveraged to create personalized online experiences, targeted advertising, and recommendations, ultimately fostering customer engagement and loyalty. Understanding the online customer journey enables companies to optimize their website design, content, and functionality to better meet the needs and expectations of their audience.

Similarly, acknowledging individuals who physically visit a company's store is important for providing an integrated and seamless customer experience across different channels. By implementing technologies like in-store tracking or loyalty programs, businesses can bridge the gap between the online and offline worlds. Recognizing customers when they enter a physical store allows companies to offer personalized assistance, promotions, or rewards based on their past interactions and preferences. This not only enhances customer satisfaction but also encourages repeat visits and builds a stronger brand-consumer relationship.

Currently there are no effective ways to correlate and provide attribution to anonymous individuals who have browsed a website with a subset of those individuals who visit the store. In short, if a user does not establish an account as an outcome of their web visit it is difficult to know which individuals who visit a store on-site to make purchases can be attributed to the earlier browser engagement. Connecting online and in person sales processes as part of a single sales process has been difficult as users often explore products, colors, options, etc. which becomes the motivation for a subsequent visit to one or more physical sites. While companies identify the most successful marketing channels, campaigns, or touchpoints as those that lead to conversions, those conversions often require interactions beyond those supported by ecommerce. Currently the transition from online to in-person sale largely results in a restart of the sales process as the local vendor is unaware of the customer's prior customer journey, requirements, and overt interests.

Additionally, customers of on-line experience or physical activities represent an opportunity to cross sell between vendors. Currently cross selling opportunities in there environments are limited to browser only interactions technologies such as Cookie syncing (sometimes called cookie matching) which is a process used to synchronize user data across different sales networks. However, Cookie syncing is generally insufficient because of both increasing rejection of cookies as well as the inability to connect online activity of anonymous users to physical sales interactions.

Embodiments described herein provide a system and method to provide anonymous, discommoding users with a continuity of service between on-line browser interactions and on-site interactions. This technology addresses the long felt need to recognize and analyze customer interactions across touchpoints in the sales cycle, allowing companies to refine their overall approach, increase sales, and foster long-term customer loyalty.

Embodiments described herein provide for a user interface on a user device that collects sensor data (e.g., video and/or audio) of a customer. The sensor data may be retrieved either solely for the purposes of the embodiments described herein, or may be collected as part of a user interaction with the user interface, such as in interacting with a customer service avatar. The sensor data may be associated with user information such as active webpages, web analytics, web domain, browser data, IP address, app configuration, cache content, browser history, operating system, cookies, location, browser plugins, hardware configuration, social media connections, gyroscope, orientation, acceleration, networked devices, etc. The collected sensor data and user information may be combined into packets and sent to a local interaction device, which may be located at a store for example. Packets may be filtered and only sent to local interaction devices which are most likely to be visited by the customer (e.g., those most proximate physically).

When a customer uses a local interaction device, the local interaction device may identify them (i.e., correlate the customer to a packet) by matching the customer to one or more of the sensor data acquired previously. For example, a camera on the local interaction device may be used to take an image and/or video of the customer's face which may be compared to information in the received packets to correlate a specific packet with a customer. The customer's voice may also be recorded and compared to a voice recorded in the packet. In some embodiments, the voice recording is used as a confirmation of the facial recognition.

Once a customer is mapped to a certain packet, the local interaction device may retrieve the other information associated with the customer in the packet (e.g., online interactions, preferences, etc.) and tailor the in-store experience accordingly. For example, local interaction device may display a map showing the physical location of items in the store which the customer showed an interest in online.

Embodiments described herein provide a number of benefits. For example, the correlation of users from anonymous online interactions to in-person interaction allows for a continuity of service for a customer without requiring manual entry of identifying information. The customer may remain relatively anonymous as embodiments described herein match an anonymous person to themselves, without the need for providing other identifying information such as name, phone number, email address, etc. By only sending information to likely physical locations, and allowing the information to expire, system and individual computer usage is minimized, allowing for less memory and computation resources to be used/required. The filtering of less relevant information also increases the accuracy of the predictions in correlating online to in-person customers.

FIG. 1 illustrates an exemplary system 100 for continuity of service, according to some embodiments. System 100 employs sensors such as (but not limited to) a camera and microphone for interaction with an anonymous user of a web browser 140 operating on a computational device 110. This interaction can be offered in the form of a collaborative AI assistant 140*a* which uses local sensors for functions selected from (but not limited to): speech recognition, speaker recognition, emotion classification, sentiment analysis, natural language processing, voice to text, gesture recognition, and biometrics. In alternate embodiments sensor can be used independent of active user engagement simply to provide information for indexing of the user. As users interact with a webpage via a browser 140 said camera performs data gathering for facial recognition 120 as well as natural language processing to identify a spoken key word and subsequently perform speaker recognition 130 based on knowledge of the speech recognition.

This combination of image capture for facial recognition combined with audio data capture for speaker recognition, allows for a sequential hierarchy of a multimodal identification process. The multimodal data, representing the recognition of the user's face and voice, is associated with the user activity and engagement with presented data selected from (but not limited to): active webpages, web analytics, web domain, browser data, IP address, app configuration, cache content, browser history, operating system, cookies, location, browser plugins, hardware configuration, social media connections, gyroscope, orientation, acceleration, networked devices Once data relative to an anonymous user has been gathered this payload is filtered based on a geographic mapping 160 which sorts locations relative to the activity and engagement with presented data. Once filtered based on a geographic mapping 160 allows for transport 180 of activity and engagement to those locations most likely to be used continue the customer engagement process. The meta data representing the user activity and engagement from computational device 110, user identification metrics 120 and 130 and indexed target locations 160 can also have appended data representing a expiry of said payload 190*a* so that information from an array of user interactions 190*a* and 190*b* can expire to limit the number of target user identifiers. By limiting the number of local data sets the local interaction device 195 can more effectively distinguish between users recognizing that a minimum threshold level of facial correspondence is required and speaker recognition is used as a subsequent qualifier of user identity is employed followed by the local interaction avatars 140*b* presentment for conversational confirmation of user activity or engagement questions as a final enablement of the continued engagement having confirmed that the user 105 of the computational device 110 is the same individual user 105 at now is presented at the local interaction device 195.

Figure 2:
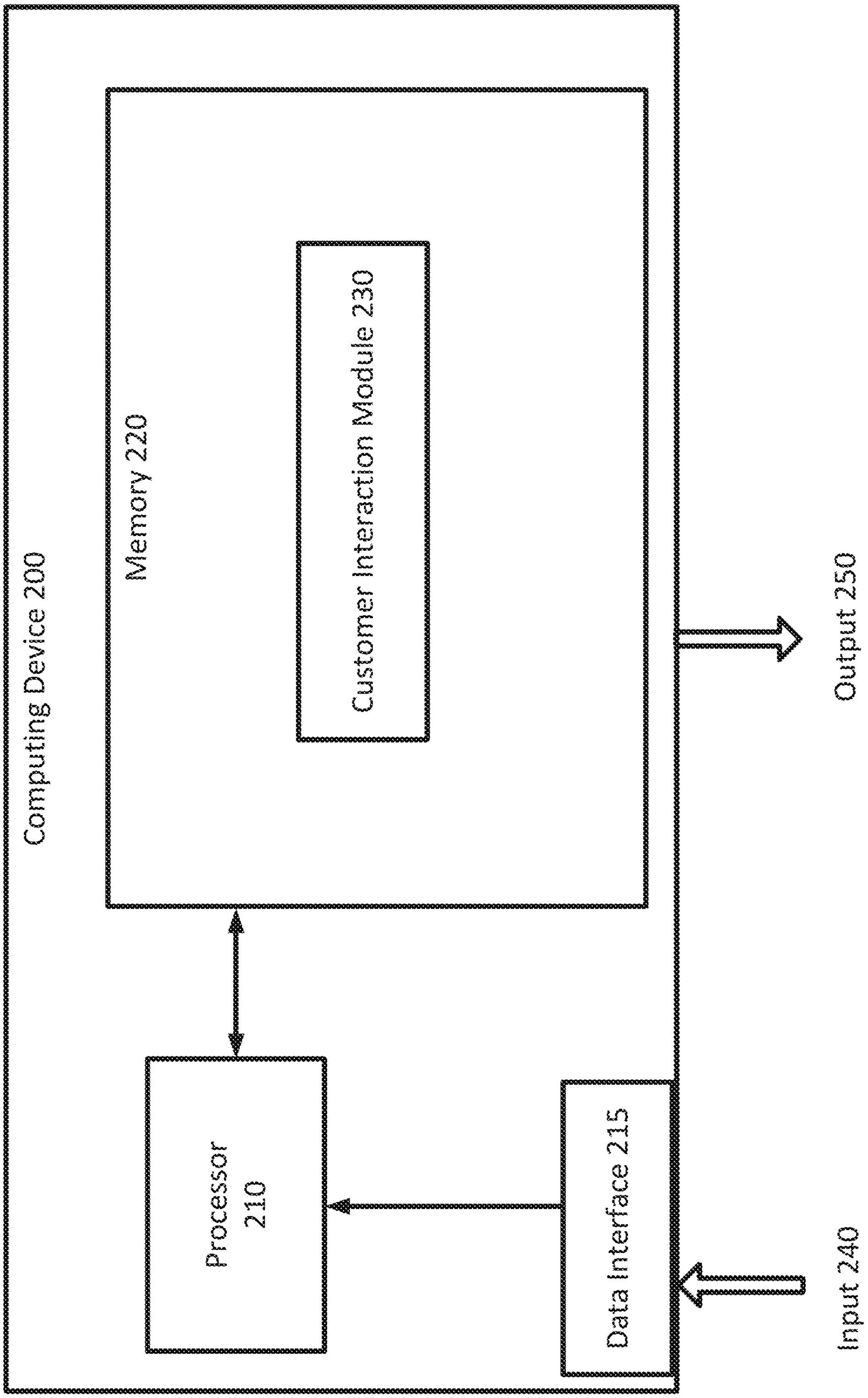
FIG. 2 is a simplified diagram illustrating a computing device implementing the system described in FIG. 1, according to some embodiments.

FIG. 2 is a simplified diagram illustrating a computing device 200 implementing the system described in FIG. 1, according to one embodiment described herein. For example, computing device 200 may be a computational device 110 and/or a local interaction device 195. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for customer interaction module 230 that may be used to implement and/or emulate the systems and models, and/or to implement any of the methods described further herein. Customer interaction module 230 may receive input 240 such as sensor (e.g., camera or microphone) data and/or other customer interaction information (e.g., purchasing history, etc.) via the data interface 215 and generate an output 250 which may be a packet including the collected data either in original form or modified form. For example, image data may be converted to an abstract representation of facial features. In some embodiments, input 240 may be information packets, and customer interaction module 230 may correlate the information (e.g., sensor data) from the input packet to local sensor data and identify a correlation to a customer, and present information and/or modify behavior based on that correlation.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as images or audio, from a user via the user interface.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
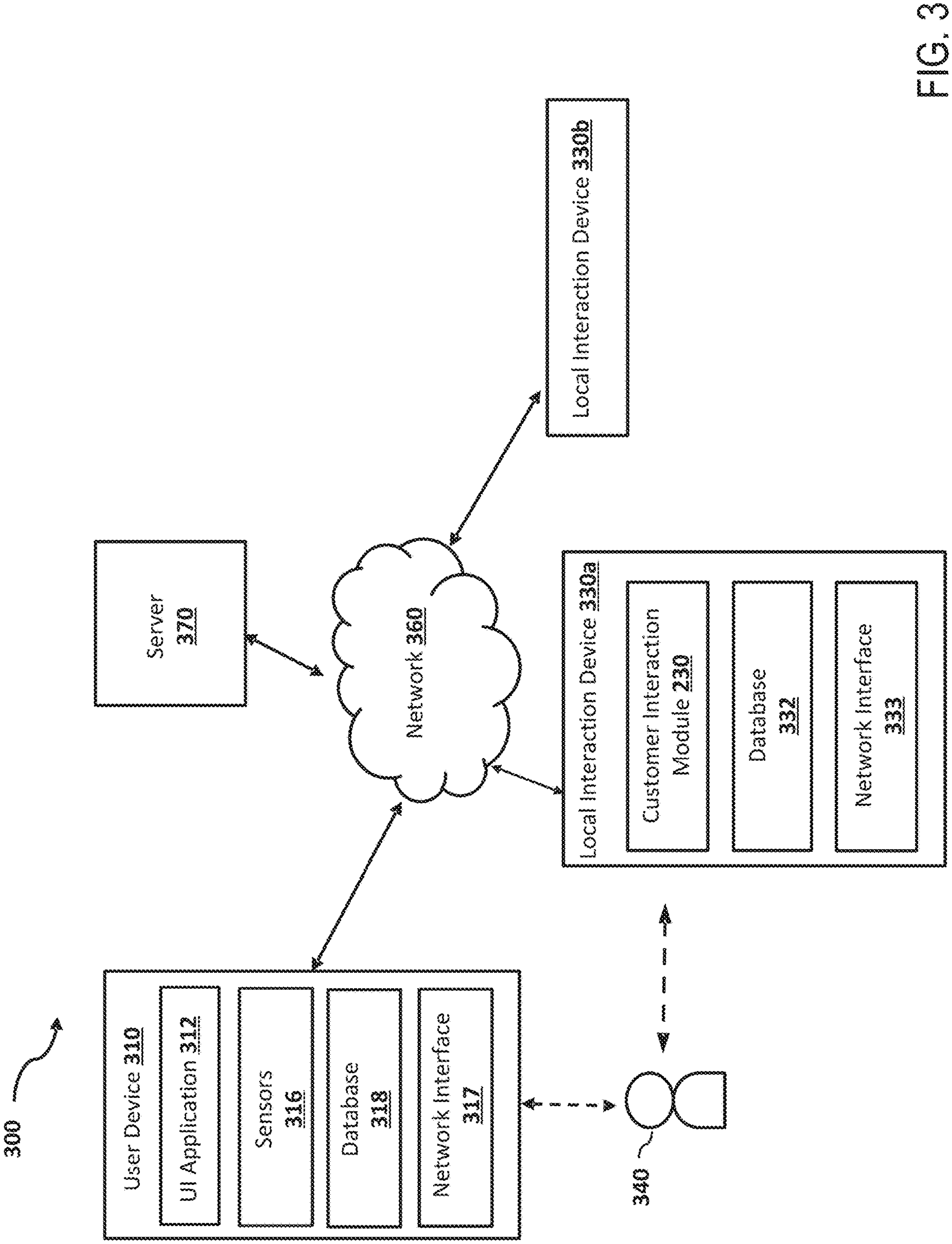
FIG. 3 is a simplified block diagram of a networked system suitable for implementing the system described in FIGS. 1-2 and other embodiments described herein.

FIG. 3 is a simplified block diagram of a networked system 300 suitable for implementing the system described in FIGS. 1-2 and other embodiments described herein. In one embodiment, system 300 includes the user device 310 (e.g., computational device 110) which may be operated by user 340 (e.g., customer 105), server 370, local interaction devices 330*a*-330*b*, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

User device 310, server 370, and local interaction devices 330*a*-330*b* may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with server 370 and/or the local interaction devices 330*a*-330*b*. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and sensors 316, which may correspond to executable processes, procedures, and/or applications with associated hardware. For example, the user device 310 may display a customer service avatar, and receive sensor input from a user via sensors 316 (e.g., camera and/or microphone). In other embodiments, user device 310 may include additional or different modules having specialized hardware and/or software as required.

In various embodiments, user device 310 includes other applications as may be desired in particular embodiments to provide features to user device 310. For example, other applications may include security applications for implementing client-side security features, programmatic client applications for interfacing with appropriate application programming interfaces (APIs) over network 360, or other types of applications. Other applications may also include communication applications, such as email, texting, voice, social networking, and IM applications that allow a user to send and receive emails, calls, texts, and other notifications through network 360.

User device 310 may further include database 318 stored in a transitory and/or non-transitory memory of user device 310, which may store various applications and data and be utilized during execution of various modules of user device 310 such as interaction with a website and sensor data. Database 318 may store user profile relating to the user 340, predictions previously viewed or saved by the user 340, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with server 370 and/or local interaction devices 330*a*-330*b*. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Server 370 may perform some of the functions described herein. For example, in some embodiments, rather than user deice 310 sending packets directly to local interaction devices 330*a* and/or 330*b*, server 370 may perform the filtering functions and determine which local interaction device 330 to send packets. Server 370 may also determine expiration of packets. In some embodiments, server 370 stores customer packets and performs the correlation described herein using data provided by local interaction devices 330.

Local interaction device 330*a* may be housed with the customer interaction module 230 and its submodules described in FIG. 2. In some implementations, customer interaction module 230 may receive data from user device 310 or server 370 via the network 360 to generate customer correlations. The generated customer correlations may also be sent to another device for review by a user, for example a store employee.

The database 332 may be stored in a transitory and/or non-transitory memory of the local interaction device 330*a*. In one implementation, the database 332 may store data obtained from the user device 310 and/or server 370. In one implementation, the database 332 may store parameters of the customer interaction module 230.

In some embodiments, database 332 may be local to the local interaction device 330*a*. However, in other embodiments, database 332 may be external to the local interaction device 330*a* and accessible by the local interaction device 330*a*, including cloud storage systems and/or databases that are accessible over network 360.

The local interaction device 330*a* includes at least one network interface component 333 adapted to communicate with user device 310 and/or server 370 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Figure 4:
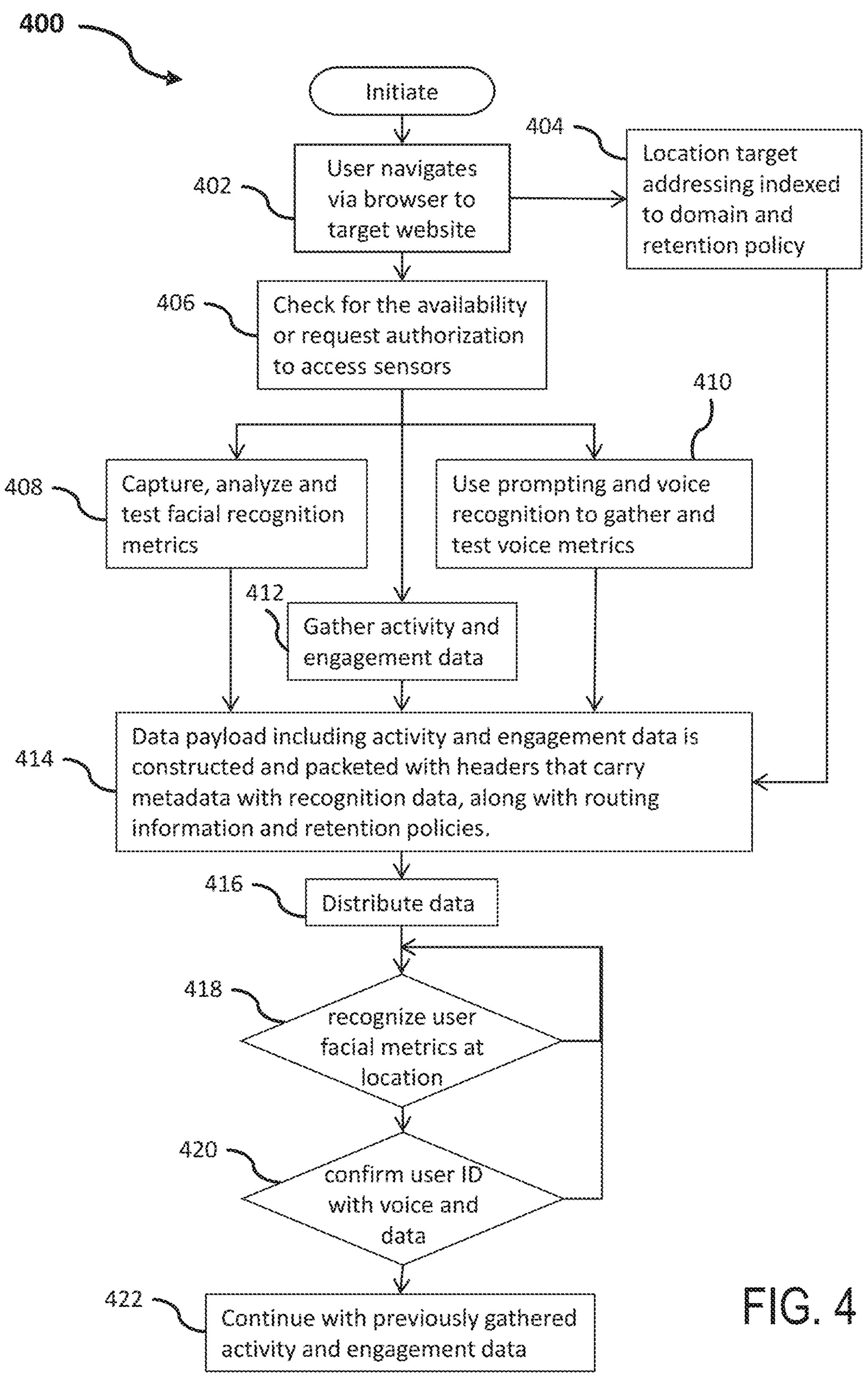
FIG. 4 is an example logic flow diagram illustrating a method of continuity of service based on the system shown in FIG. 1, according to some embodiments.

FIG. 4 is an example logic flow diagram illustrating a method 400 of continuity of service based on the system shown in FIG. 1, according to some embodiments.

One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the customer interaction module 230 (e.g., FIGS. 2 and 3)

As illustrated, the method 400 includes a number of enumerated steps, but aspects of the method 400 may include additional steps before, after, and in between the enumerated steps. In some aspects, one or more of the enumerated steps may be omitted or performed in a different order.

The method 400 begins with initiate of the method which begins at action 402 with an unknown user navigating to a target website via browser. In some embodiments, the browser is structured to analyze the interests of the anonymous user. In some embodiments, the browser actively engages the unknown user to prompt and gather data descriptive of the user's interests. Target websites may have one or more locations related to the target website. For example, a website selling widget X may have multiple locations within the vicinity of the user's browser's location so that continuity of the users activities and/or engagement on said target website via browser may be continue (or extended) to said locations related to the target website. In some embodiments, at action 404, target websites and indexed locations may use expiration policies to minimize the total number of users to be recognized which reduces the computational load and error rates.

At action 406, the target website via browser may already have sensor capture enabled or may request sensor capture allowance whether it be for avatar interaction or simply a direct request. At action 408, as the user interacts with the target website via the browser the user's image is gathered, analyzed and tested for use as a facial recognition template. At action 410, as the user interacts with the target website avatar audio can presented as prompts and natural language processing is used to recognize the sample speech which simplifies the speaker recognition as the same target words can be trained for recognition. At action 412, other activity and/or engagement data may be gathered by the browser associated with the user. Actions 408, 410, and/or 412 may be performed together in parallel or at distinct times.

At action 414, when the user closes, navigates away or the session times out activity and engagement data is routed with user recognition payload to the targeted locations indexed as capable of extending the user browser activity and engagement to another location without ever having to ask the user for the creation of an account or the entry of personal identifiable information. In some embodiments, the user's identity is never known to the system. For example, the system may only know that an anonymous website visitor is the same user as the visitor to a physical location. Method 400 also allows for optimized classification without significant computational resources or latency.

At action 414, a data payload including activity and engagement data is constructed and packeted. In some embodiments, the constructed packets include headers that carry metadata with recognition data. In some embodiments, the headers include routing information and/or retention policies. At action 416, the constructed packets are distributed to remote systems (e.g., to local interaction device 195).

Upon arriving at one of the targeted physical locations, users are anonymously recognized. At action 418, the local system initially uses facial metrics to identify the user. At action 420, the local system confirms with speaker recognition and prompting technologies. Using this two-step verification, a user is correlated to the original user. At action 422, this triggers the retrieval of the user's sales journey and preferences from their earlier online interactions. The system effectively continues the user's sales process, providing a personalized and tailored experience based on their historical data.

Figure 5:
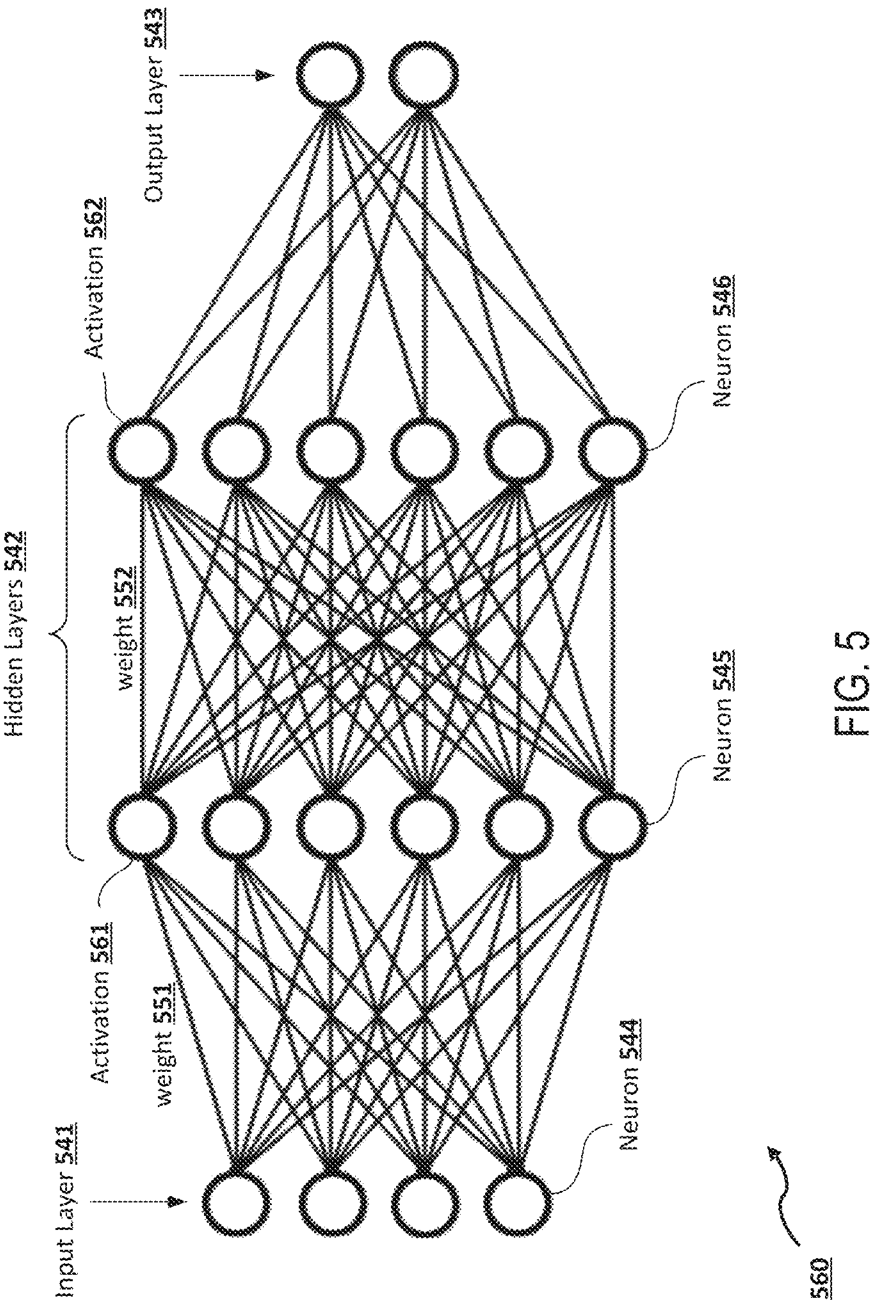
FIG. 5 is a simplified diagram illustrating a neural network structure, according to some embodiments.

FIG. 5 is a simplified diagram illustrating the neural network structure, according to some embodiments. In some embodiments, the customer interaction module 230 may be implemented at least partially via an artificial neural network structure shown in FIG. 5. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data such as training data, user input data, vectors representing latent features, etc. The number of nodes (neurons) in the input layer 541 may be determined by the dimensionality of the input data (e.g., the length of a vector of the input). Each node in the input layer represents a feature or attribute of the input.

The hidden layers 542 are intermediate layers between the input and output layers of a neural network. It is noted that two hidden layers 542 are shown in FIG. 5 for illustrative purpose only, and any number of hidden layers may be utilized in a neural network structure. Hidden layers 542 may extract and transform the input data through a series of weighted computations and activation functions.

For example, as discussed in FIG. 2, the customer interaction module 230 may receive input 240 such as sensor (e.g., camera or microphone) data and/or other customer interaction information (e.g., purchasing history, etc.) and generate an output 250 which may be a packet including the collected data either in original form or modified form. For example, image or audio or other data may be converted to an abstract vector representation. In some embodiments, input 240 may be information packets, and customer interaction module 230 may correlate the information (e.g., sensor data) from the input packet to local sensor data and identify a correlation to a customer (e.g., via output layer 543 of hardware platform 560), and present information and/or modify behavior based on that correlation.

To perform the correlation, a neural network such as the one illustrated in FIG. 5 may be utilized to perform, at least in part, the correlation. Each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the customer interaction module 230 may comprise the transformative neural network structure of layers of neurons, and weights and activation functions describing the non-linear transformation at each neuron. Such a neural network structure is often implemented on one or more hardware processors 410, such as a graphics processing unit (GPU).

In one embodiment, the customer interaction module 230 may be implemented by hardware, software and/or a combination thereof. For example, the customer interaction module 230 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based customer interaction module 230 may be trained by iteratively updating the underlying parameters (e.g., weights 551, 552, etc., bias parameters and/or coefficients in the activation functions 561, 562 associated with neurons) of the neural network based on a loss function. For example, during forward propagation, the training data such as video, audio, or other customer related data are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding ground truth correlation) from the training data, to compute a loss function that measures the discrepancy between the predicted output and the expected output.

Given a loss function, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as unseen text input.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 5 is exemplary. For example, different neural network structures may be utilized, and additional neural-network based or non-neural-network based component may be used in conjunction as part of module 230. For example, a text input may first be embedded by an embedding model, a self-attention layer, etc. into a feature vector. The feature vector may be used as the input to input layer 541. Output from output layer 543 may be output directly to a user or may undergo further processing. For example, the output from output layer 543 may be decoded by a neural network based decoder. The neural network illustrated in FIG. 5 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 230. The trained neural network thus improves neural network technology in customer interactions.

In some embodiments, a neural network is used in identifying a user. For example, a comparison of images captured via a device 110 and device 195 is performed by embedding the images into an abstract representation via a neural network, and computing the distance between the abstract representations (e.g., Euclidean distance between embedding vectors). An action may be performed by the local device when, for example, the comparison results in a distance measurement below a predetermined threshold.

The devices described above may be implemented by one or more hardware components, software components, and/or a combination of the hardware components and the software components. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of correlating anonymous customer information, comprising:

receiving, at a local interaction device, a packet including:

customer sensor data from at least one of a microphone or a camera, and customer interaction information, wherein the packet is distributed to the local interaction device, from among a plurality of local interaction devices, based on a geographic mapping of one or more locations most likely to be visited by the customer, and wherein the packet includes a retention policy that causes the packet to expire;

capturing an image of a customer;

capturing an audio recording of the customer;

performing a comparison of the image and the audio recording with the customer sensor data, the comparison including performing facial recognition based on the image and subsequently confirming the facial recognition based on the audio recording; and generating a first embedding of the sensor data from the camera via a neural network;

generating a second embedding of the image of the customer via the neural network; and performing a comparison between the first embedding and the second embedding;

wherein the comparison includes computing the Euclidean distance between vectors, and performing an action with the customer interaction information based on the comparison.

2. The method of claim 1, wherein the customer interaction information includes an identifier of an item viewed by the customer.

3. The method of claim 2, wherein the action includes displaying the item via a display.

4. The method of claim 2, wherein the action includes indicating the item to a user via a mobile device.

5. The method of claim 1, wherein the performing the action is based on the distance being below a threshold.

6. A system for correlating anonymous customer information, comprising:

a memory storing processor executable instructions; and one or more processors that read and execute the processor executable instructions from the memory to perform operations comprising:

receiving, at a local interaction device, a packet including:

customer sensor data from at least one of a microphone or a camera, and customer interaction information, wherein the packet is distributed to the local interaction device, from among a plurality of local interaction devices, based on a geographic mapping of one or more locations most likely to be visited by the customer, and wherein the packet includes a retention policy that causes the packet to expire;

capturing an image of a customer;

capturing an audio recording of the customer;

performing a comparison of the image and the audio recording with the customer sensor data, the comparison including performing facial recognition based on the image and subsequently confirming the facial recognition based on the audio recording; and generating a first embedding of the sensor data from the camera via a neural network;

generating a second embedding of the image of the customer via the neural network; and performing a comparison between the first embedding and the second embedding, where in the comparison includes computing the Euclidean distance between vectors, and, performing an action with the customer interaction information based on the comparison.

7. The system of claim 6, wherein the customer interaction information includes an identifier of an item viewed by the customer.

8. The system of claim 7, wherein the action includes displaying the item via a display.

9. The system of claim 7, wherein the action includes indicating the item to a user via a mobile device.

10. The system of claim 6, wherein the performing the action is based on the distance being below a threshold.

11. A non-transitory machine-readable medium comprising a plurality of machine-executable instructions which, when executed by one or more processors, are adapted to cause the one or more processors to perform operations comprising:

receiving, at a local interaction device, a packet including:

customer sensor data from at least one of a microphone or a camera, and customer interaction information, wherein the packet is distributed to the local interaction device, from among a plurality of local interaction devices, based on a geographic mapping of one or more locations most likely to be visited by the customer, and wherein the packet includes a retention policy that causes the packet to expire;

capturing an image of a customer;

capturing an audio recording of the customer;

performing a comparison of the image and the audio recording with the customer sensor data, the comparison including performing facial recognition based on the image and subsequently confirming the facial recognition based on the audio recording:

generating a first embedding of the sensor data from the camera via a neural network;

generating a second embedding of the image of the customer via the neural network;

and performing a comparison between the first embedding and the second embedding, wherein the comparison includes computing the Euclidean distance between vectors, and performing an action with the customer interaction information based on the comparison.

12. The non-transitory machine-readable medium of claim 11, wherein the customer interaction information includes an identifier of an item viewed by the customer.

13. The non-transitory machine-readable medium of claim 12, wherein the action includes displaying the item via a display.

14. The non-transitory machine-readable medium of claim 12, wherein the action includes indicating the item to a user via a mobile device.

* * * * *